May 6, 1941.　　　G. W. MONTGOMERY　　　2,240,662
TRANSMISSION
Filed Dec. 28, 1939　　　3 Sheets-Sheet 1

Inventor
G. W. Montgomery
By Clarence A. O'Brien
and Hyman Berman
Attorneys

May 6, 1941. G. W. MONTGOMERY 2,240,662
TRANSMISSION
Filed Dec. 28, 1939 3 Sheets-Sheet 3

Inventor
G. W. Montgomery
By Clarence A. O'Brien
and Hyman Berman
Attorneys

Patented May 6, 1941

2,240,662

UNITED STATES PATENT OFFICE 2,240,662

TRANSMISSION

George W. Montgomery, Detroit, Mich.

Application December 28, 1939, Serial No. 311,412

6 Claims. (Cl. 192—57)

This invention appertains to new and useful improvements in transmissions such as are employed on motor vehicles and more particularly to a transmission of the fluid type.

The principal object of the present invention is to provide a fluid transmission which in operation will serve as the equivalent of an overdrive.

Another important object of the invention is to provide a fluid transmission wherein there are a minimum number of moving parts and wherein the elements are so arranged as to be positive acting and substantially fool-proof in operation.

These and various other important objects and advantages of the invention will become apparent to the reader of the following specification.

In the drawings:

Figure 5 is a fragmentary detailed sectional view taken substantially on a line 5—5 of Figure 3.

Figure 1:
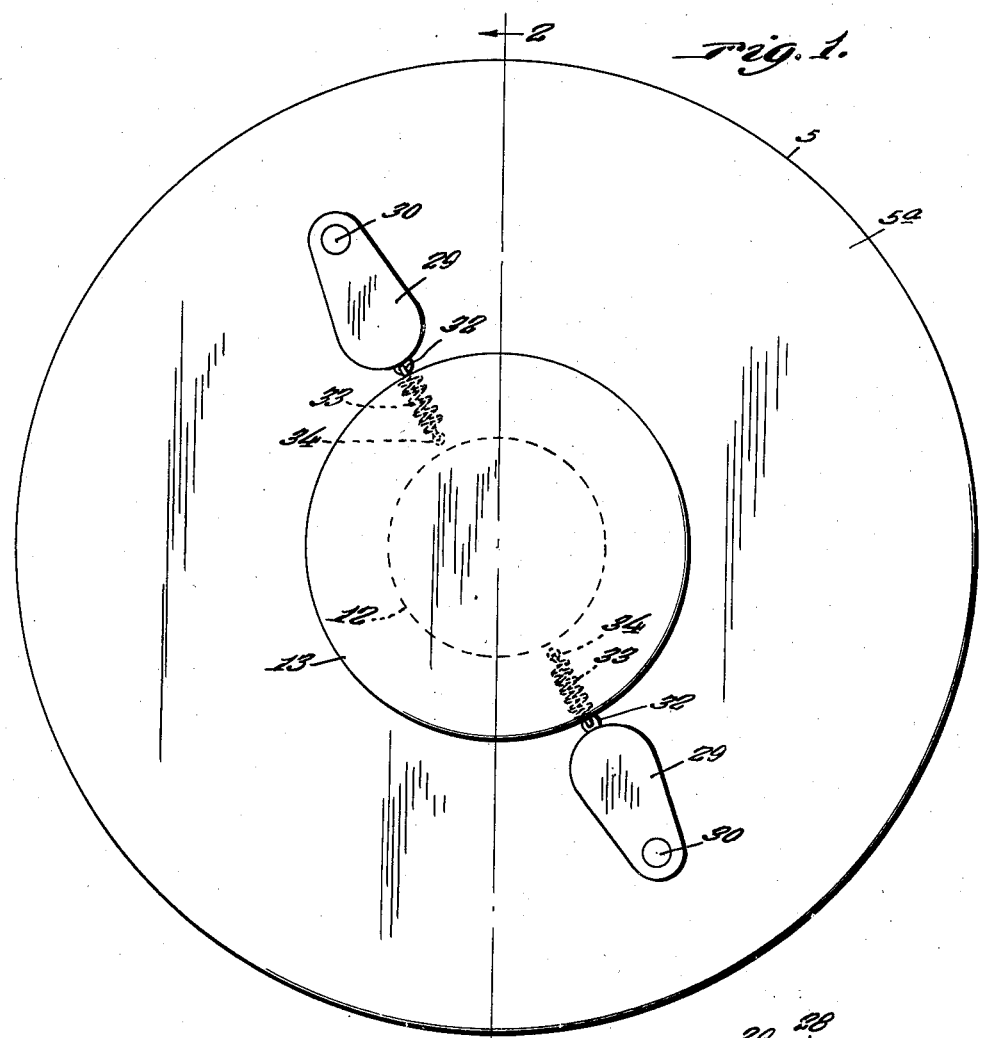
Figure 1 represents a front elevational view of the transmission.
Figure 4:
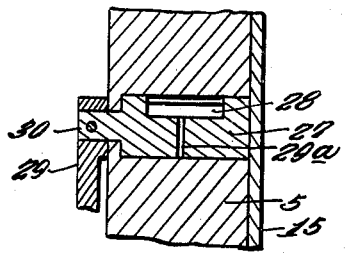
Figure 4 is a fragmentary detailed sectional view through one of the choke valves taken substantially on a line 4—4 of Figure 3.
Figure 7:
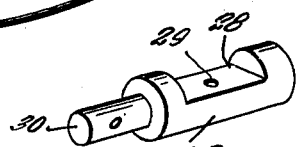
Figure 7 is a perspective view of one of the choke valves.

Referring to the drawings wherein like numerals designate like parts, it can be seen that numeral 5 represents an annular body having an internal annular passageway 6. The body 5 is hollow and receives a driven shaft carried triangular-shaped cam 7. The cam 7 has arcuate corner portions 8 for wiping engagement with the inner side of the body 5, that is the wall 9. The cam 7 is keyed as at 10 to a driven shaft 11.

A hub structure 12 extends forwardly from the front wall 5a of the body 5 and terminates in a drive shaft coupling plate 13. Between the forward end of the shaft 11 and the socket 12 are roller bearings 14. The rear side of the body 5 has a closure plate 15 secured thereto by machine screws 16 and this plate 15 has a rearwardly extending tubular formation 17 between which and the driven shaft 11 roller bearings 18 are interposed.

Intake ports 19 and 20 are provided between the passageway 6 and the central chamber. Exhaust ports 21 and 22 are provided between the passageway 6 and the central chamber, and as shown in Figure 3, pistons 23 and 24 are provided between the corresponding intake and exhaust ports and wipe at their inner ends, the perimeter of the cam 7.

Figure 6:
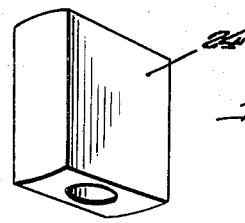
Figure 6 is a perspective view of one of the pistons.

The wall of the chamber 6 at the outer circumference thereof is formed with recesses 25 for receiving the outer ends of compression springs 26 which have their inner end portions disposed into sockets in the aforementioned pistons 23 and 24, these pistons being of rectangular cross section, as suggested in Figure 6.

Figure 3:
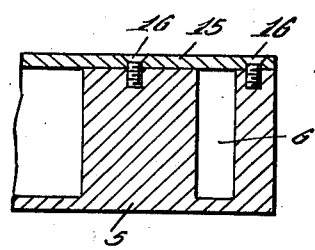
Figure 3 is a transverse sectional view on a line 3—3 of Figure 2.
Figure 3:
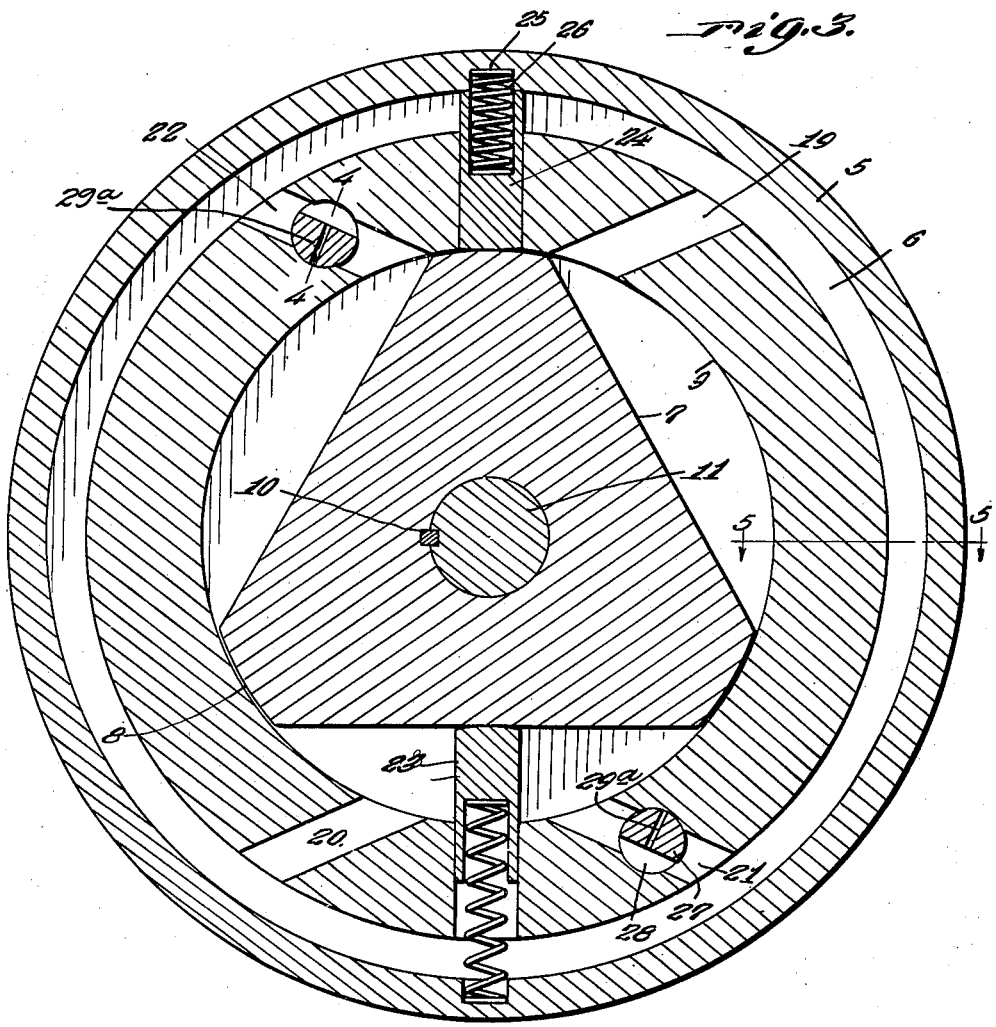

In each of the exhaust ports 21 and 22 is a rotary valve 27 having a reduced side portion defining a by-pass 28 when the valve is turned in an opened position as shown in Figure 3. Each of these rotary valves 27 has a bleed duct 29a as suggested in Figure 3.

Drag arms 29 operative in response to rotation of the body 5 are secured to the outer ends on pintle extensions 30 of the valves 27 as suggested in Figure 1 and the free ends of these arms 29 are provided with ears 32 connected by coiled tension springs 33 to suitable anchor means 34 on the adjacent side of the body 5 tending to hold the valves 27 in open position.

Figure 2:
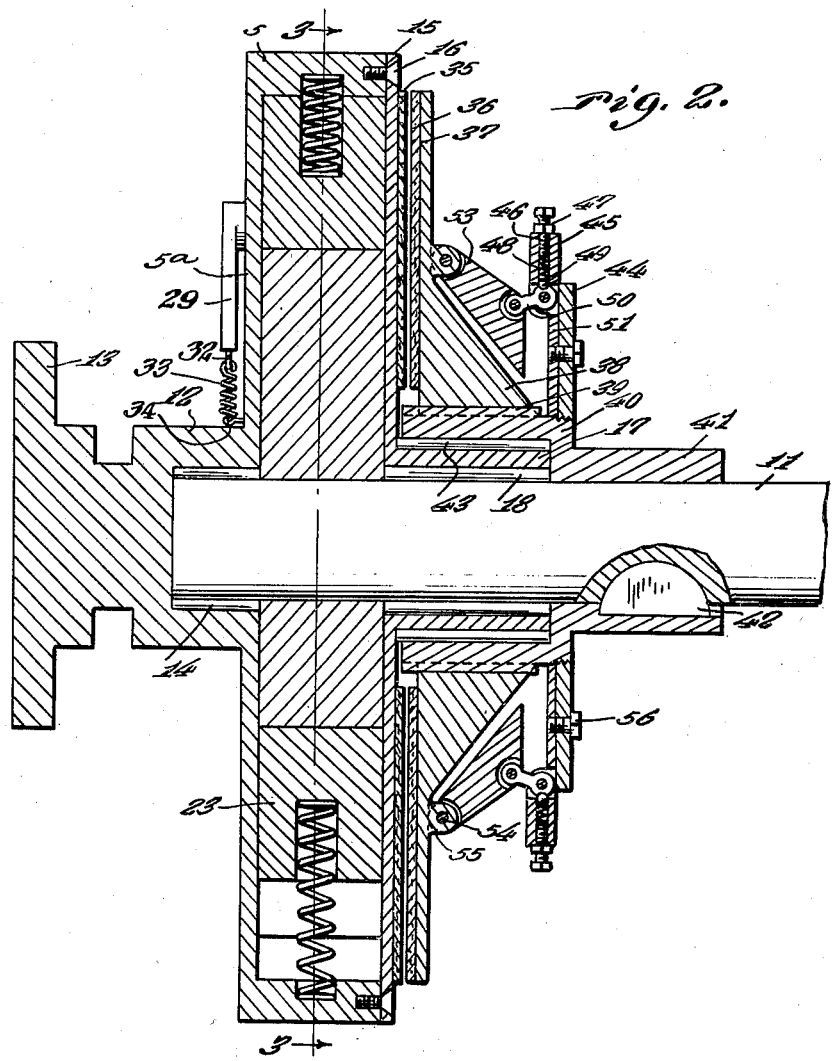
Figure 2 is a section on the line 2—2 of Figure 1.

On the rear side of the closure plate 15 is a clutch liner 35 opposed to a clutch liner 36 on a clutch plate 37. The clutch plate 37 has an inwardly flaring enlarged portion 38 splined as at 39 to an extension 40 of a sleeve 41 in circumferential relation to the driven shaft 11, as shown in Figure 2 and which is keyed to said driven shaft 11 by a suitable key 42. Interposed between the tubular extension 40 and the tubular extension 17 of the plate 15 are roller bearings 43.

Threaded onto the shoulder portion of the sleeve 41 to permit adjustment is the plate 44 which has a pair of outstanding diametrical opposite barrels 45 thereon into each of which is threadedly disposed a screw 46 adapted to be held in place by jamb nuts 47. Each of these screws 46 bears against a compression spring 48 which in turn bears against a ball 49 protruding into a recess in one end of a corresponding link 50, this link being interposed between the adjustable clearance plate 51 and a corresponding centrifugal force responsive weight 53. The weights 53 are pivotally connected as at 54 to ears 55 on clutch plate 37. Screws 56 are disposed through the plate 44 and into the clearance plate 51 to the end that the clearance plate can be adjusted to the desired relationship with respect to the weights 53.

When set in motion, the body 5 rotates in a clockwise direction as shown in Figure 1 around the cam 7, causing the pistons 23 and 24 to travel in and out as they ride along the perimeter of the cam 7. As speed increases, the weight arms 29 on the choke valves 27 are thrust outward closing the choke valves 27 in the exhaust ports 21. In other words, when rotation of the casing is increased or accelerated the inertia of the weights is such as to cause them to slightly swing, in opposition to the action of springs 33, out of a truly radial position whereby they are then subject to the action of centrifugal force. As this is gradually accomplished, the pressure also is increased in the compression chambers causing the pistons 24 to exert an equivalent pressure on the cam 7, thus causing the cam 7 to rotate with the body 5. The cam 7 and the driven shaft 11 being rigidly coupled starts the load in motion.

The sleeve 41 and driven shaft 11 being keyed together results in the operation of the clutch plate 37 in response to the governor weight 53. The governor weights 53 are held by the snap arrangement 50—49 until reaching predetermined cruising speed whereupon they release and permit operation of the clutch plate 37.

When valves 27 are rotated by weights 29 to a relatively closed position a restricted bypass of liquid past the valves will be provided for by the said bypasses thereby preventing a full one to one drive relationship between the casing and driven shaft 11 so long as the friction clutch, under control of weights 53, is not moved into an engaged relationship.

By referring to Figure 2, it can be seen that when the weights 53 move the clutch plate 37 to engaged position, the action has taken place by reason of the speed of the driven shaft and not by the speed of the motor in contrast to the action of the weight arms 29. When the vehicle has reached, for instance, a speed of from thirty to thirty-five miles per hour, the governor weights 53 operate the clutch plate 37 establishing a drive connection between the drive and driven members at the same speed, hence a four to one ratio is obtained.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:

1. A fluid transmission comprising a drive body, a driven shaft, said body being hollow, a cam on the driven shaft located in the hollow body, an annular passageway in the body, intake and exhaust ports between the passageway and the interior of the body, slide pistons riding the periphery of the cam, and centrifugal force operated valves in the said exhaust ports.

2. A fluid transmission comprising a drive body, a driven shaft, said body being hollow, a cam on the driven shaft located in the hollow body, an annular passageway in the body, intake and exhaust ports between the passageway and the interior of the body, slide pistons riding the periphery of the cam, and centrifugal force operated valves in the said exhaust ports, said cam being of triangular shape and having its corner portions reduced and of a curvature to snugly wipe the inside wall of the hollow body.

3. A fluid transmission comprising a drive body, a driven shaft, said body being hollow, a cam on the driven shaft located in the hollow body, an annular passageway in the body, intake and exhaust ports between the passageway and the interior of the body, slide pistons riding the periphery of the cam, and centrifugal force operated valves in the said exhaust ports and clutch means between the driven shaft and one side of the body.

4. A fluid transmission comprising a drive body, a driven shaft, said body being hollow, a cam on the driven shaft located in the hollow body, an annular passageway in the body, intake and exhaust ports between the passageway and the interior of the body, slide pistons riding the periphery of the cam, and centrifugal force operated valves in the said exhaust ports and clutch means between the driven shaft and one side of the body and centrifugal force exerting means for the said clutch.

5. A fluid transmission comprising a drive body, a driven shaft, said body being hollow, a cam on the driven shaft located in the hollow body, an annular passageway in the body, intake and exhaust ports between the passageway and the interior of the body, slide pistons riding the periphery of the cam, and centrifugal force operated valves in the said exhaust ports, clutch means between the driven shaft and one side of the body, centrifugal force exerting means for the said clutch and snap detent means for the said centrifugal force exerting means of the clutch.

6. A fluid transmission comprising a drive body, a driven shaft, said body being hollow, a cam on the driven shaft located in the hollow body, an annular passageway in the body, intake and exhaust ports between the passageway and the interior of the body, slide pistons riding the periphery of the cam, centrifugal force operated valves in the said exhaust ports, clutch means between the driven shaft and one side of the body, said valves each provided with a small bleeder duct extending therethrough.

GEORGE W. MONTGOMERY.